A. FOSS.
PROCESS FOR THE PRODUCTION OF NITRIC ACID FROM NITROUS GASES.
APPLICATION FILED FEB. 23, 1915.
1,200,334.
Patented Oct. 3, 1916.
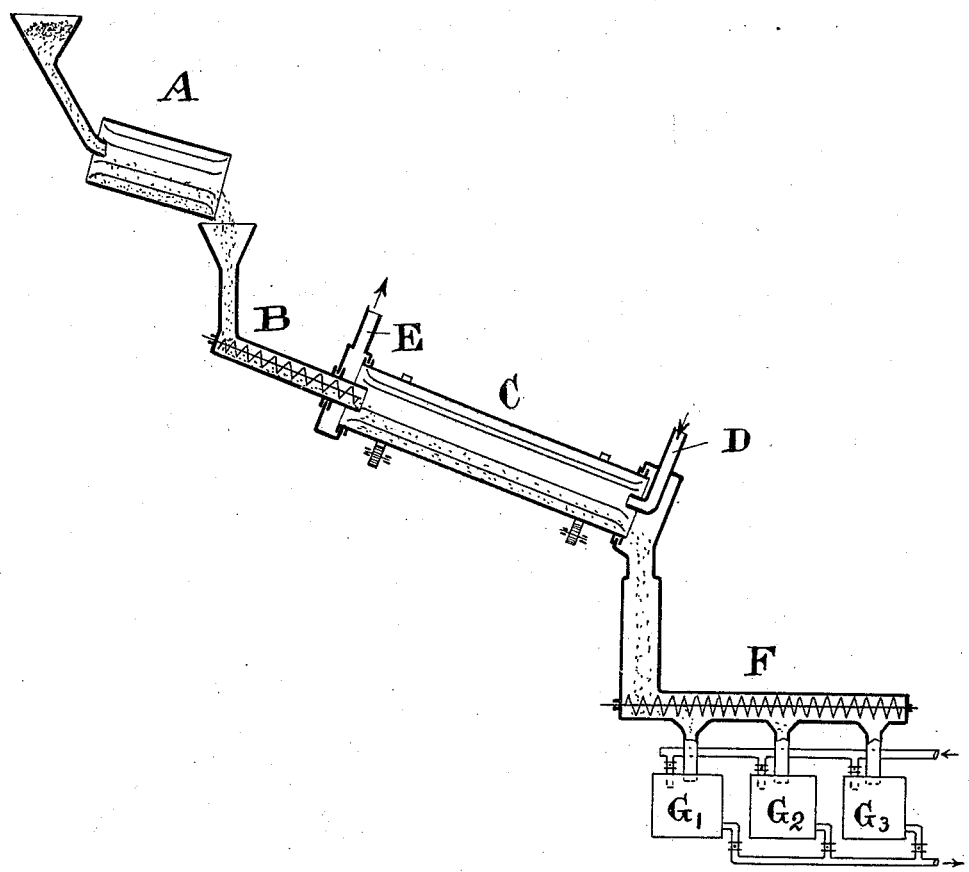

UNITED STATES PATENT OFFICE.

ANTONIUS FOSS, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE PRODUCTION OF NITRIC ACID FROM NITROUS GASES.

1,200,334.

Specification of Letters Patent.   Patented Oct. 3, 1916.

Application filed February 23, 1915.   Serial No. 10,071.

*To all whom it may concern:*

Be it known that I, ANTONIUS FOSS, a subject of the King of Norway, residing at Christiania, Norway, have invented certain new and useful Improvements in Processes for the Production of Nitric Acid from Nitrous Gases; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the utilization of nitrous gases obtained by the oxidation of air nitrogen, and has for its object an improved process for the production of nitric acid from such nitrous gases.

The industrial utilization of the nitrous gases obtained by the oxidation of nitrogen is at present carried out in such a manner that these gases after having been cooled are caused to pass through a series of absorption towers, where the gases are absorbed in water and form dilute nitric acid. In this manner the gases are so greatly reduced in concentration by successive stages that a further absorption in water cannot be carried out with commercial advantage. The last traces of nitrous gases are therefore usually absorbed in aqueous solutions of alkalis, whereby nitrite and some nitrate is obtained as a by-product of the dilute nitric acid obtained by the absorption in water.

As the market for the sale of nitrite is somewhat limited, it is necessary to carry the absorption in water to a greater degree than is desirable, and in this manner not only a very dilute nitric acid is obtained from the last of the series of absorption towers, but a very large absorption plant is required, the working of which is unprofitable. For these reasons it has been proposed to use a dry absorption in lime, producing thereby nitrate of lime directly, without producing nitric acid as an intermediate product. This method, although a good one, has, however, as yet not obtained any extended use.

According to my present invention I proceed to carry the absorption process into effect in a profitable manner, in that the absorption in water is not carried to a further extent than is practical in view of the cost of the plant and the cost of its operation, and the residue, or the attenuated nitrous gases are subjected to a concentration process, so that said residue is also recovered as nitric acid, or as other valuable nitrogen oxygen compounds. Such concentration of the attenuated nitrous gases is attained by absorbing them in alkalis, after which the alkali nitrate or nitrite produced is decomposed by heating the same in the presence of oxids, hydroxids or other compounds of metals or of the metals of the alkaline earths. The nitrous gases so obtained are very concentrated and are easily absorbed in water, whereby nitric acid of a concentration up to 50% is produced.

The concentration of the attenuated nitrous gases may be carried out as follows: The very dilute nitrous gases are absorbed in an aqueous solution of an alkali, for example carbonate of soda, after which the resulting solid sodium nitrite or sodium nitrite-nitrate mixture, as the case may be, is mixed with an oxid or hydroxid of a metal, for example oxid of iron, manganese, aluminium, silicon, or the like, or an oxid or hydroxid of a metal of the alkaline earths, such as oxid of calcium, or with carbonates of said earths, for example, carbonate of lime. This mixture is then so highly heated that a decomposition of the nitrite takes place, liberating the nitrous acid gas, and at the same time the alkali unites with the metallic or alkaline earth compounds added.

The heating may take place directly or indirectly. Of special advantage is a direct heating, by means of hot air, or other hot gases, to which steam may be added. The steam may be superheated if desirable or necessary. The supply of steam is, however, not necessary if the added substances themselves contain a sufficient quantity of water to enable the formation of nitrous acid gas. By the reaction concentrated nitrous gases will escape, which may be easily condensed or absorbed to form a comparatively strong nitric acid. The residuum contains the alkali in combination with the added substance, such, for example as ferrite, aluminate, silicate, etc., of alkali metal. This mass is leached, whereupon the soluble contents of the solution are decomposed in a known manner for the purpose of converting as much of the alkali contents as possible into soluble compounds, as hydroxid or carbonate. The solution which now contains only hydroxid or carbonate, is filtered off from the insoluble substances, such as oxids of iron, aluminium, silicon, etc. This solution is now again employed for the absorption of new quantities of nitrous gases, whereby, as already mentioned, nitrite is obtained, which is then again treated in the manner above described.

The substance employed for the decomposition of the alkali metal nitrite may, after leaching and drying, either be used again as an addition to new quantities of salt, or if it is sufficiently pure, it represents a valuable by-product. For instance, if bauxite be used as a decomposing means, oxid of aluminium may be obtained in an especially pure condition, suitable as a material for the production of aluminium or aluminium compounds.

The accompanying drawing illustrates diagrammatically, partly in section and partly in elevation, an apparatus for carrying out my process of recovering the attenuated nitrous gases.

The process may be carried out in the following manner, when a revoluble furnace is made use of: In the mixing apparatus A is produced an intimate mixture of alkali metal nitrite or nitrite-nitrate and bauxite. This mixture is carried, by means of a conveyer B to the revoluble furnace C. This latter may, for instance, be made of iron, because at the temperatures used the nitrous gases do not attack iron. For effecting the agitation of the mass the furnace is provided with ribs, by means of which the material is lifted up in the direction of the movement of the furnace and then again falls down simultaneously with the progression of the material through the furnace. At the discharge end of the furnace the heating gas, for instance hot air, to which may be supplied the necessary quantity of water vapor, is introduced through D. The developed nitrous gases are drawn off through a pipe E. The reaction mass is carried by means of a conveyer F to the lixiviation vessels $G_1$, $G_2$, $G_3$, which are suitably constructed, and are similar to the known "Shank" lixiviation tanks. The liquid coming from these leaching tanks is passed, when necessary, to suitable plants in which the alkali compound is decomposed. From this plant the resulting liquor is returned to the residual gas absorbing plant. The mass which is left in the leaching tanks is then conveyed back to the mixing apparatus A after having been dried, and is mixed with fresh quantities of alkali metal nitrite.

It will be understood from the above that the whole process is to be considered as a concentration process for the nitrous gases in the manufacture of nitric acid.

The alkali as well as the decomposing agent circulates in the process without being consumed; and owing to the fact that the additional apparatus required by this process is quite insignificant, a considerable reduction of the water absorption plant is possible, and only a very small increase in the alkaline absorption plant is necessary. As the increased production of nitric acid takes place without any considerable increase in the cost of concentration or evaporation, a very much more rational working of the absorption process is obtained than has been possible heretofore.

I claim—

1. In the utilization of nitrous gases, the process which comprises absorbing said gases in alkali, decomposing the resulting alkali metal nitrogen compounds by suitable decomposing agents to liberate nitrous acid gas in a more concentrated form, recovering the alkali for the absorption of fresh quantities of gases, and recovering and returning the decomposing agents into the cycle of operations.

2. In the utilization of nitrous gases resulting from air-nitrogen oxidation, the process which comprises effecting an economic absorption of the gas in water to form nitric acid, absorbing the attenuated residual gases in alkali, decomposing the resulting alkali metal nitrate by suitable substances to liberate concentrated nitrous gases, recovering the alkali and decomposing substances and returning them into the cycle of operations, and absorbing the concentrated nitrous gases in water to produce nitric acid.

3. In the utilization of nitrous gases, the process which comprises absorbing said gases in alkali, mixing the resulting alkali metal salt with bauxite, heating the mixture while passing a gas therethrough to liberate concentrated nitrous gases, leaching the resulting solid product, precipitating the alumina in solution, returning the liquor so obtained into the cycle of operations for absorbing gas, and returning the solid residue into the cycle of operations for decomposing alkali metal salt, and converting the concentrated nitrous gases into nitric acid.

4. In the utilization of nitrous gases, the process which comprises effecting the absorption of the gases to an economic extent in water to form nitric acid, absorbing the attenuated residual gases in a solution of an alkali, recovering the resulting alkali metal salt, mixing said salt with bauxite, heating the mixture while supplying a gas thereto having an oxidizing action, thereby liberating concentrated nitrous gases, leaching the resulting solid product, precipitating the alumina in solution, returning the solution into the cycle of operations to absorb fresh quantities of attenuated gas, returning the residue into the cycle of operations for mixture with the salt, and converting the concentrated nitrous gases into nitric acid.

In testimony that I claim the foregoing as my invention, I have signed my name in presence of two subscribing witnesses.

ANTONIUS FOSS.

Witnesses:
 C. F. HANSEN,
 M. E. GUTTORENSEN.